United States Patent
Carlsson et al.

(10) Patent No.: US 12,447,276 B2
(45) Date of Patent: Oct. 21, 2025

(54) CASSETTE AND MEDICAMENT DELIVERY DEVICE COMPRISING CASSETTE

(71) Applicant: SHL MEDICAL AG, Zug (CH)

(72) Inventors: Daniel Carlsson, Enskede (SE); Torbjörn Neby, Hägerston (SE)

(73) Assignee: SHL Medical AG, Zug (CH)

( * ) Notice: Subject to any disclaimer, the term of this patent is extended or adjusted under 35 U.S.C. 154(b) by 573 days.

(21) Appl. No.: 17/925,805

(22) PCT Filed: May 26, 2021

(86) PCT No.: PCT/EP2021/064029
§ 371 (c)(1),
(2) Date: Nov. 16, 2022

(87) PCT Pub. No.: WO2021/254744
PCT Pub. Date: Dec. 23, 2021

(65) Prior Publication Data
US 2023/0173186 A1 Jun. 8, 2023

(30) Foreign Application Priority Data

Jun. 16, 2020 (EP) .................. 20180158

(51) Int. Cl.
*A61M 5/31* (2006.01)
*A61M 5/20* (2006.01)
(Continued)

(52) U.S. Cl.
CPC ............ *A61M 5/3134* (2013.01); *A61M 5/20* (2013.01); *A61M 5/24* (2013.01); *A61M 5/3202* (2013.01);
(Continued)

(58) Field of Classification Search
CPC ........ A61M 5/3134; A61M 5/24; A61M 5/20; A61M 5/3202; A61M 2005/2403;
(Continued)

(56) References Cited

U.S. PATENT DOCUMENTS 4,613,329 A 9/1986 Bodicky
9,669,158 B2 6/2017 McLoughlin et al.
(Continued)

FOREIGN PATENT DOCUMENTS

CN 103228306 B 4/2016
CN 104080501 B 7/2016
(Continued)

OTHER PUBLICATIONS

International Search Report and Written Opinion for Int. App. No. PCT/EP2021/064029, mailed Jun. 22, 2021.

*Primary Examiner* — Tasnim Mehjabin Ahmed
(74) *Attorney, Agent, or Firm* — McDonnell Boehnen Hulbert & Berghoff LLP

(57) ABSTRACT

A cassette for a medicament delivery device having a base unit is disclosed, where the cassette has a longitudinal axis defining a proximal direction and a distal direction; a body for accommodating a medicament container; a medicament delivery member; and a cap connected to the body through a connector, the cap enclosing a proximal end of the body; wherein the connector is disconnected when a distal force acting on the body in the distal direction and relative to the cap when the cassette is attached to the base unit. A medicament delivery device containing the cassette is also provided.

20 Claims, 11 Drawing Sheets

(51) Int. Cl.
  *A61M 5/24* (2006.01)
  *A61M 5/32* (2006.01)
(52) U.S. Cl.
  CPC ............ *A61M 2005/2403* (2013.01); *A61M 2005/2433* (2013.01); *A61M 2005/2488* (2013.01); *A61M 2205/0216* (2013.01); *A61M 2205/121* (2013.01); *A61M 2205/276* (2013.01)
(58) Field of Classification Search
  CPC .. A61M 2005/2433; A61M 2005/2488; A61M 2205/0216; A61M 2205/121; A61M 2205/276
  See application file for complete search history.

(56) References Cited

U.S. PATENT DOCUMENTS

| | | |
|---|---|---|
| 9,764,084 B2 | 9/2017 | McLoughlin et al. |
| 9,795,734 B2 | 10/2017 | McLoughlin et al. |
| 9,808,575 B2 | 11/2017 | McLoughlin et al. |
| 9,884,152 B2 | 2/2018 | McLoughlin et al. |
| 9,901,673 B2 | 2/2018 | McLoughlin et al. |
| 9,901,674 B2 | 2/2018 | McLoughlin et al. |
| 10,258,740 B2 | 4/2019 | McLoughlin et al. |
| 2013/0296795 A1 | 11/2013 | Ekman et al. |
| 2013/0317446 A1 | 11/2013 | Hourmand et al. |
| 2014/0330203 A1* | 11/2014 | McLoughlin ........... A61M 5/20 604/131 |
| 2015/0343155 A1 | 12/2015 | Zenker |
| 2016/0120751 A1* | 5/2016 | Mounce ................. A61P 19/10 604/404 |
| 2021/0038817 A1* | 2/2021 | Carlsson ................ A61M 5/24 |

FOREIGN PATENT DOCUMENTS

| | | |
|---|---|---|
| CN | 104394924 B | 2/2017 |
| CN | 106456899 B | 12/2019 |
| EP | 2714145 B1 | 5/2015 |
| EP | 2714142 B1 | 8/2016 |
| EP | 2714144 B1 | 8/2016 |
| EP | 2714157 B1 | 8/2016 |
| EP | 2714155 B1 | 9/2016 |
| EP | 2714151 B1 | 5/2017 |
| EP | 2714143 B1 | 9/2017 |
| EP | 3138595 B1 | 8/2018 |
| JP | 2016518879 A | 6/2016 |
| WO | 2012/164389 A2 | 12/2012 |
| WO | 2012/164390 A2 | 12/2012 |
| WO | 2012/164394 A2 | 12/2012 |
| WO | 2012/164397 A1 | 12/2012 |
| WO | 2012/164402 A2 | 12/2012 |
| WO | 2012/164403 A2 | 12/2012 |
| WO | 2012/164404 A2 | 12/2012 |
| WO | 2012/164406 A2 | 12/2012 |
| WO | 2013/001378 A2 | 1/2013 |
| WO | 2014/143815 A2 | 9/2014 |
| WO | 2015/110532 A1 | 7/2015 |
| WO | 2018077809 A1 | 5/2018 |
| WO | 2018167137 A1 | 9/2018 |
| WO | 2019/122946 A1 | 6/2019 |
| WO | 2019/158372 A1 | 8/2019 |
| WO | 2019/191105 A1 | 10/2019 |
| WO | 2020015986 A1 | 1/2020 |

\* cited by examiner

CASSETTE AND MEDICAMENT DELIVERY DEVICE COMPRISING CASSETTE

CROSS REFERENCE TO RELATED APPLICATIONS

The present application is a U.S. National Phase Application pursuant to 35 U.S.C. § 371 of International Application No. PCT/EP2021/064029 filed May 26, 2021, which claims priority to European Patent Application No. 20180158.6 filed Jun. 16, 2020. The entire disclosure contents of these applications are herewith incorporated by reference into the present application.

TECHNICAL FIELD

The present disclosure generally relates to a cassette for a medicament delivery device. In particular, a cassette for a medicament delivery device having a base unit, and a medicament delivery device comprising a cassette, are provided.

BACKGROUND

A wide range of medicament delivery devices for self-administration of medicaments are known. Some medicament delivery devices comprise a base unit and a cassette for connection to the base unit. The base unit usually comprises a drive mechanism, such as a motor and/or a battery, and can thus be reused for multiple medicament deliveries, such as injections. The cassette may contain or receive a medicament container with the medicament to be delivered, such as a syringe, a cartridge or the like. Upon activation of the medicament delivery device, the medicament is expelled through a medicament delivery member, for example a needle or a nozzle. The cassette can be discarded after medicament delivery and substituted with a new one.

In some prior art solutions, the user needs to insert the cassette into the base unit and pull off a cap from the cassette before medicament delivery. If the user removes the cap before inserting the cassette into the base unit, there is a risk that the user is hurt by the needle. This is particularly the case for auto-injectors that are activated by pressing a needle cover against an injection site, where the cassette is inserted into the base unit in the same direction as the needle cover is pressed for activation, e.g. in a distal direction. In such auto-injectors, the cap prevents the needle cover from being pressed. If the cap is prematurely removed, i.e. prior to inserting the cassette into the base unit, there is also an increased risk of contamination of the medicament delivery member.

WO 2019122946 A1 discloses an automatic injector device comprising a reusable motorized transmission assembly and a single-use, disposable, drug delivery assembly. The drug delivery assembly comprises a syringe body, a needle and a device cap.

SUMMARY

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial" refer to a direction extending from the proximal end to the distal end, typically along the device or components thereof in the direction of the longest extension of the device and/or component.

Similarly, the terms "transverse", "transversal" and "transversally" refer to a direction generally perpendicular to the longitudinal direction.

Further, the terms "circumference", "circumferential", "circumferentially", "rotation", "rotational" and "rotationally" refer to a direction generally perpendicular to the longitudinal direction and at least partially extending around the longitudinal direction.

According to one aspect, there is provided a cassette for a medicament delivery device having a base unit, the cassette comprising a longitudinal axis defining a proximal direction and a distal direction; a body for accommodating a medicament container; a medicament delivery member; and a cap connected to the body by means of a connection, the cap enclosing a proximal end of the body; wherein the connection is arranged to be disconnected by means of a distal force acting in the distal direction on the body relative to the cap when the cassette is attached to the base unit.

The distal force can be generated from a mounting sequence of the cassette to a base unit of a medicament delivery device. In this way, the cap is prevented from being removed prior to mounting the cassette to the base unit. As a consequence, a risk that the user is injured by the medicament delivery member, such as a needle, is reduced.

The distal force can be generated by an interface formed between the body and the base unit, e.g. the body is arranged with an engaging member and the counter engaging member is arranged on the base unit of the medicament delivery device. The interface may be a cam interface, a screw thread interface or a bayonet interface.

The cassette of the present disclosure may be designed to be compatible with certain medicament delivery devices in the market and/or produced by different manufacturer of the cassette. Those medicament delivery devices should comprise a power unit with a base unit and is configured to be attached with a cassette holding a medicament container; the contained medicament is actuated to therefore be delivered by the power unit. Therefore, the interface between the body and the base unit is dependent on the structure of the base unit of the medicament delivery devices for attaching a cassette.

The engaging member on the body may be integral with the body or arranged on a detachable accessory for fixedly attaching to the body. In the latter embodiment, the cassette of the present disclosure can be compatible with most of the medicament delivery devices which are used with a cassette; since the cassette may be used with multiple detachable accessories with different engaging member regarding to different medicament delivery devices in the market.

The connection is formed by a connector arranged on the cap and a counter connector arranged on the body. When the connector and the counter connector are aligned with each other, the connection is thereby formed.

When the cap is connected to the body by means of the connection, the cap is locked to the body. When the connection is disconnected, the cap is unlocked from the body. In addition to disconnecting the connection, the distal force may cause the body to move in the distal direction relative to the cap. The relative movement between the body and the cap causes a misalignment between the connector and the counter connector, such that the connection is therefore disconnected. The cap may be removable from the body by means of a proximal movement of the cap when the connection is disconnected. To remove the cap, the user may grab and pull the cap.

The connection is not permanent. Instead, the connection is arranged to prevent the user from remove the cap from the body prior to connection of the cassette to the base unit, and to allow the user to remove the cap from the body after connection of the cassette to the base unit.

The cassette may be configured to be inserted into the base unit by movement in the distal direction relative to the base unit. When the connection is disconnected, the cap may be configured to be removed from the cassette by movement in the proximal direction. Thus, the direction in which the cassette is inserted into the base unit is opposite to the direction in which the cap is removed from the cassette. The cap may be rotationally locked to the body, both when the connection is connected and disconnected.

The medicament delivery member may for example be a needle or a nozzle. The body, the medicament delivery member and/or the cap may be substantially concentric with, or concentric with, the longitudinal axis. The cap and/or the body may be made of plastic.

The connection may comprise a snap-fit. In this case, the connector and/or counter connector may comprise one or more resilient parts. The one or more resilient parts may be provided in the body and/or in the cap.

The connector may be a cap protrusion arranged on the cap. The cap protrusion may be a bump. Alternatively, or in addition, the cap protrusion may be radially flexible. The cap protrusion itself may be made by an elastic material, e.g. TPE, or the cap protrusion is arranged on an edge of a resilient portion of the cap. In the latter example, the cap may have a distal portion that is made by a resilient material, e.g. PE, PP, and the distal portion arranged with a cut-out or slot, so that when a force radial outwardly applied on the protrusion, the protrusion is able to flex radially or circumferentially outward.

The cap protrusion may extend laterally inwards with respect to the longitudinal axis. Alternatively, or in addition, the connector may be a plurality of cap protrusions. In this case, each cap protrusion may be arranged in a common plane. This plane may be substantially perpendicular to, or perpendicular to, the longitudinal axis.

The counter connector may be a body connection protrusion arranged on the body. The body connection protrusion may extend laterally outwards with respect to the longitudinal axis.

The body connection protrusion may be a flange. In this case, the cap may be snapped over the flange when the connection is connected. In order to disconnect the connection, the body may move in the distal direction such that the flange snaps through the body connection protrusion. The body connection protrusion may be flexible.

The cassette may further comprise a cover covering the medicament delivery member, wherein the cap encloses the cover. Such cassette may be used in a medicament delivery device constituted by an auto-injector. The cover may be used to activate medicament delivery, e.g. by pressing the cover against a dose delivery site. Various ways to activate medicament delivery by pressing such cover against a dose delivery site are known per se.

According to an alternative example, the cassette does not comprise a cover. In such cassette, the medicament delivery member may be moved proximally for medicament delivery, for example by being driven by a motor in the base unit.

The cassette may further comprise a shield having a shield engageable structure, wherein the cap comprises a cap engaging structure arranged to engage the shield engageable structure when the connection is disconnected, and wherein the shield is arranged to be removed by proximal movement of the cap when the connection is disconnected. The shield may provide a sterile barrier for the medicament delivery member. In case the medicament delivery member is a needle, the shield may comprise a flexible needle shield (FNS) and a rigid needle shield (RNS) covering the flexible needle shield.

The cap may be arranged to move proximally prior to the cap engaging structure engages the shield engageable structure when the connection is disconnected. This allows a gap to appear between the base unit and the cap when the cassette is attached to the base unit and the connection is disconnected. This gap provides an indication to the user that the cap can be pulled off. The cap may be forced in the proximal direction, for example by means of a spring, such that the cap engaging structure is brought into contact with the shield engageable structure and the gap appears when the connection is disconnected.

The cassette may further comprise an isolated needle and a cartridge containing a medicament. The isolated medicament delivery member, e.g. a needle, is fixedly hold by a hub. The hub comprises an interaction structure, the interaction structure arranged to interact with a counter interaction structure arranged on the interior part of the cap. For example, the cap may have a cogwheel arranged on is inner surface as the counter interaction structure; and the hub may have a set of racks arranged on the outer surface of the hub, the set of racks matching with the cog wheel as the interaction structure, such that the proximal movement of the cap causes a distal movement of the hub and the needle; therefore, the isolated medicament delivery member is mounted to the cartridge by the removal of the cap.

The cap may cover a major portion of the cassette. When cap is connected to the body by means of the connection, the cap may be provided along at least 50% of a length of the cassette along the longitudinal axis. Alternatively, or in addition, the cap may cover a major portion of the body.

According to a further aspect, there is provided a medicament delivery device comprising a cassette according to the present disclosure. The medicament delivery device may for example be an auto-injector. In this case, the cassette may comprise a cover for activating medicament delivery.

The medicament delivery device may further comprise a base unit arranged to drive expulsion of medicament from a medicament container in the cassette when the cassette is attached to the base unit. The cassette may be disposable and the base unit may be for multiple use.

The body may comprise the engaging member, named as a body engaging structure hereafter, and the base unit may comprise the counter engaging member, named as a base engageable structure hereafter. The body engaging structure and the base engageable structure may be arranged to generate the distal force by rotation of the body about the longitudinal axis relative to the base unit when the body engaging structure engages the base engageable structure.

The medicament delivery device may thus comprise a cap unlock mechanism comprising the body engaging structure, the base engageable structure and the connection. The cap unlock mechanism may be configured to transmit a rotation of the cassette about the longitudinal axis to a movement of the body relative to the cap in the distal direction.

In addition to the generation of the distal force causing disconnection of the connection, the rotation of the body relative to the base unit may cause the cassette to be attached to the base unit. Thus, the cap may be unlocked by an attachment sequence of the cassette to the base unit.

An interface is formed between the body engaging structure and the base engageable structure; such that the distal force is generated by rotation of the body about the longitudinal axis relative to the base unit when the body engaging structure engages the base engageable structure. The interface may be a cam interface, a screw thread interface or a bayonet interface.

The body engaging structure may be provided in a distal region of the cassette. The body engaging structure may be exposed when the cap is connected to the body by means of the connection. That is, the cap may not cover the body engaging structure.

The body engaging structure may be integral with the body or arranged on a detachable accessory for fixedly attaching to the distal region of the body. In the latter embodiment, the cassette of the present disclosure can be compatible with most of the medicament delivery devices which are used with a cassette; since the cassette may be used with multiple detachable accessories with different engaging member regarding to different medicament delivery devices in the market. The detachable accessory may be a ring shape or C-shape component that can be clamped on the distal portion of the body, in this case, the body may not have an integral body engaging structure.

When the interface is a cam interface, the base engageable structure and the body engaging structure comprise a cam profile and a cam follower arranged to follow the cam profile. The base engageable structure may comprise the cam profile and the body engaging structure may comprise the cam follower arranged to follow the cam profile. Alternatively, body engaging structure may comprise the cam profile and the base engageable structure may comprise the cam follower arranged to follow the cam profile. In any case, when the cam follower engages the cam profile and the cassette is rotated about the longitudinal axis, the body is forced in the distal direction causing the connection to be disconnected. The medicament delivery device may thus comprise a cam interface comprising the cam profile and the cam follower.

Alternatively, or in addition, the body engaging structure may comprise one or more body protrusions. Each body protrusion may protrude radially outwards with respect to the longitudinal axis. According to one variant, the body engaging structure comprises two body protrusions, e.g. oppositely arranged with respect to the longitudinal axis. The protrusions may act as a bayonet lock when the user connects the cassette to the power unit.

The cap unlock mechanism may thus comprise the cam follower, the cam profile and the connection. As an alternative to the cam follower and the cam profile, the cap unlock mechanism may comprise a linkage. By means of the linkage, the cap unlock mechanism may be configured to transmit a rotation of the cassette about the longitudinal axis to a movement in the distal direction of the body relative to the cap. Such linkage may be provided either in the cassette or in the base unit. A part of the linkage, or a part in the body acting on the linkage when the cassette is inserted into the base unit, may constitute a body engaging structure. A part of the linkage, or a part in the base unit acting on the linkage when the cassette is inserted into the base unit, may constitute a base engageable structure.

As a further alternative to the cam follower and the cam profile, the cap unlock mechanism may comprise an electrical gripper in the base unit. In this case the base unit may comprise an electrical circuit or a printed circuit board (PCB). The circuit may be arranged with a switch or an information reader. The electrical gripper may be arranged to grip and pull the body such that the distal force is generated. In this case, the pulling by the gripper may be triggered once the cassette has been rotated relative to the base unit or inserted into the base unit and switching on the switch; or be triggered once the information reader detects a certain information on the body of the cassette. Such information of on the body of the cassette may be contained in a RFID tag, a QR code or a bar code. In this embodiment, the distal force may be generated without the rotation of the cassette relative to the base unit.

The base unit may comprise a proximal surface, and the cap may comprise a distal surface arranged to mate with the proximal surface when the cassette is inserted into the base unit. In this case, the cap unlock mechanism may further comprise the proximal surface and the distal surface. Each of the proximal surface and the distal surface may be substantially perpendicular to, or perpendicular to, the longitudinal axis.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
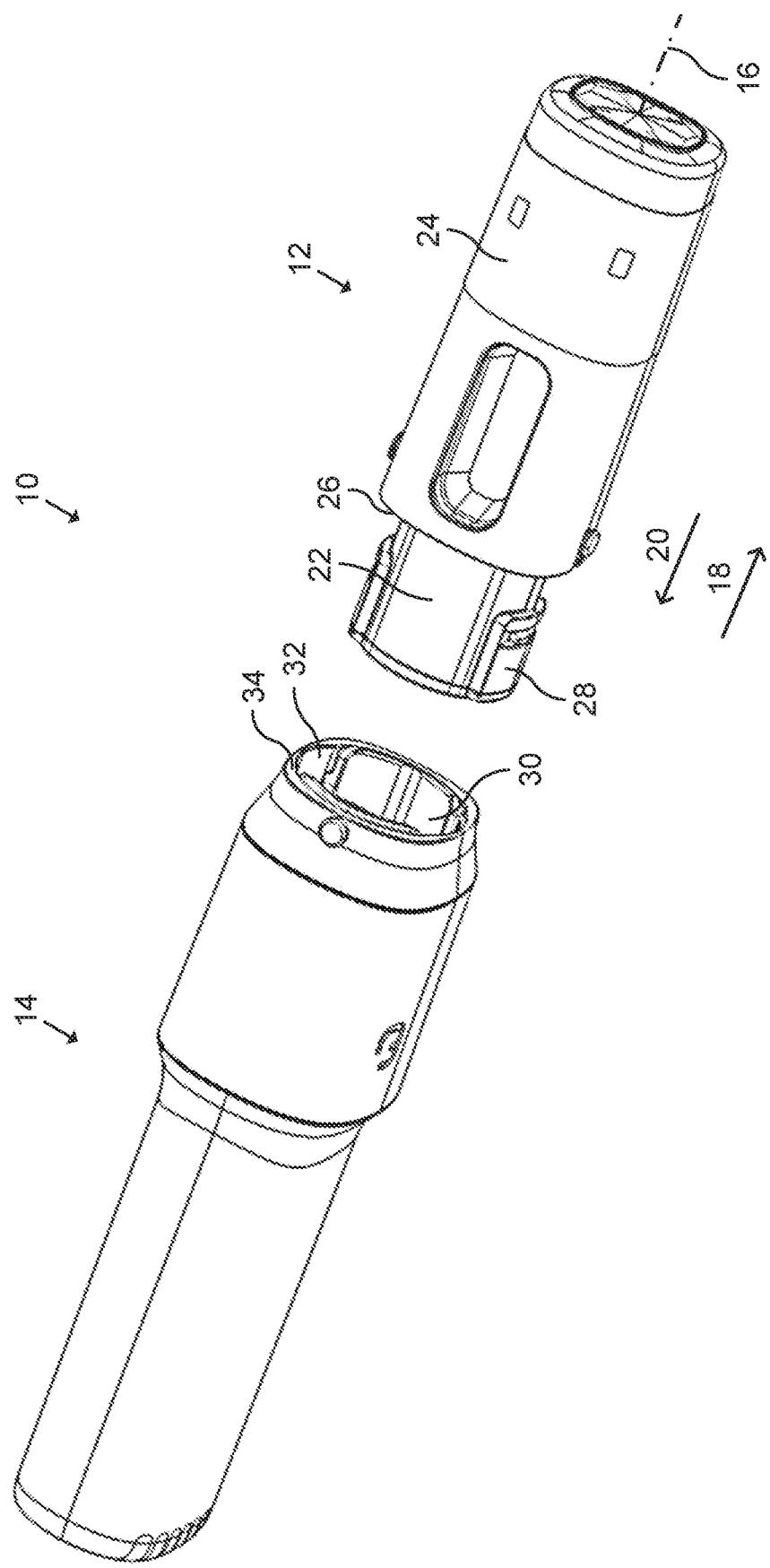
FIG. 1 schematically represents a perspective side view of a medicament delivery device comprising a cassette and a base unit.

In the following, a cassette for a medicament delivery device having a base unit, and a medicament delivery device comprising a cassette, will be described. The same or similar reference numerals will be used to denote the same or similar structural features.

FIG. 1 schematically represents a perspective side view of a medicament delivery device 10. The medicament delivery device 10 comprises a cassette 12 and a base unit 14. The cassette 12 is disposable and the base unit 14 is for multiple use.

The cassette 12 comprises a longitudinal axis 16. The longitudinal axis 16 defines a proximal direction 18, and a distal direction 20 opposite to the proximal direction 18. The cassette 12 is configured to be inserted into the base unit 14 by movement in the distal direction 20 relative to the base unit 14 and then attached to the base unit 14.

The cassette 12 comprises a body 22 and a cap 24. In FIG. 1, the cap 24 is connected to the body 22. The cap 24 is provided on a proximal side of the body 22. Each of the body 22 and the cap 24 is substantially concentric with the longitudinal axis 16. As shown in FIG. 1, the cap 24 covers a major portion of the cassette 12 along the longitudinal axis 16, in this example approximately 75%.

The cap 24 comprises a distal surface 26. The distal surface 26 lies in a plane perpendicular to the longitudinal axis 16.

The body 22 of this example comprises two cam followers 28. The cam followers 28 are oppositely arranged on the body 22 with respect to the longitudinal axis 16. Each cam follower 28 is a protrusion and protrudes radially outwards (with respect to the longitudinal axis 16) from the body 22. Each cam follower 28 is one example of a body engaging structure according to the present disclosure. The cam followers 28 are provided in a distal region of the body 22. As shown in FIG. 1, the cam followers 28 are not covered by the cap 24.

The base unit 14 is arranged to drive expulsion of medicament from a medicament container in the cassette 12 when the cassette 12 is attached to the base unit 14. The base unit 14 comprises an opening 30. The opening 30 is provided in a proximal end of the base unit 14. The opening 30 is arranged to receive a distal end of the body 22 when the cassette 12 is inserted into the base unit 14. When the cassette 12 is inserted into the base unit 14, the base unit 14 and the opening 30 thereof are substantially concentric with the longitudinal axis 16.

The base unit 14 of this example further comprises two slots 32. The slots 32 are oppositely arranged on the base unit 14 with respect to the longitudinal axis 16. Each slot 32 is a groove in the opening 30 and faces generally towards the longitudinal axis 16. Each slot 32 extends parallel with the longitudinal axis 16. The slots 32 are provided in a proximal region of the base unit 14.

The base unit 14 further comprises a proximal surface 34. The proximal surface 34 lies in a plane perpendicular to the longitudinal axis 16. The distal surface 26 of the cassette 12 is arranged to mate with the proximal surface 34 of the base unit 14 when the cassette 12 is inserted into the base unit 14.

Figure 2:
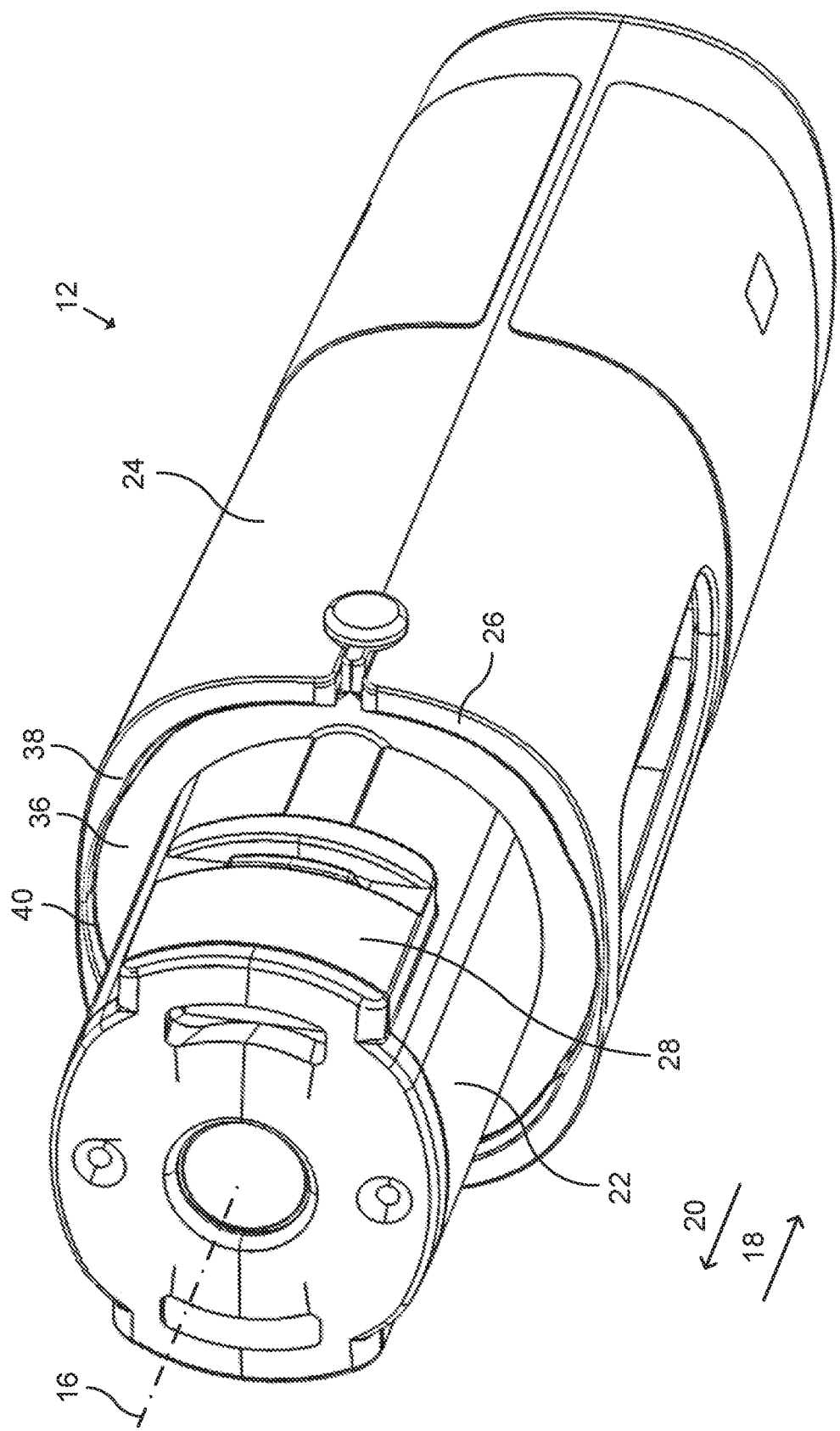
FIG. 2 schematically represents a perspective proximal view of the cassette.

FIG. 2 schematically represents a perspective proximal view of the cassette 12. As shown in FIG. 2, the body 22 comprises a flange 36. The flange 36 lies in a plane perpendicular to the longitudinal axis 16. The flange 36 extends radially outwards (with respect to the longitudinal axis 16) from the body 22. The flange 36 is one example of a body connection protrusion according to the present disclosure.

The cap 24 of this example comprises four cap protrusions 38. Each cap protrusion 38 is arranged in a common plane perpendicular to the longitudinal axis 16. The cap 24 may however comprise, one, two, three, or more than four cap protrusions 38. Each cap protrusion 38 is here exemplified as a bump extending radially inwards with respect to the longitudinal axis 16.

In FIG. 2, the cap protrusions 38 are snapped over the flange 36. This prevents the cap 24 from being removed from the body 22. The cap protrusions 38 and the flange 36 form a connection 40 connecting the cap 24 to the body 22. The connection 40 of this example is a snap-fit connection. The cap protrusions 38 are arranged symmetrically on the two halves of the cap 24, and in a preferred embodiment, a cut-out or slot is provided on the distal portion of the cap 24 and also between the two halves of the cap 24 (could be seem from FIG. 5), since the cap 24 in this example is at least partially made by a resilient material, e.g. thermoplastic material, the cut-out or the slot enables the distal portion of the cap 24 to be radially flexed out relative to the longitudinal axis 16 when a force is radial outwardly applied on the protrusions. The cap protrusions 38 are therefore become somewhat "resilient" (or radially flexible) but rigid enough to prevent a user from detaching the cap 24 from the body 22 by grabbing the body 22 with one hand, grabbing the cap 24 with another hand, and pulling the body 22 and the cap 24 away from each other.

Figure 5:
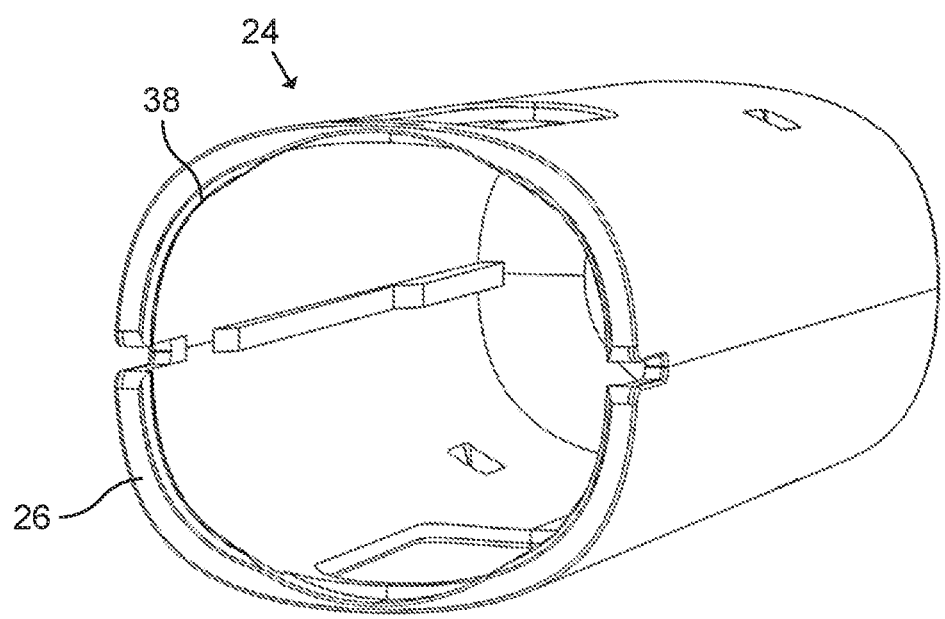
FIG. 5 schematically represents a perspective proximal view of a cap of the cassette.

It should be noted that, alternatively, the cut-out or slot can be a pair as shown in FIG. 5, or can only be one cut-out or slot that is arranged on the distal portion of the cap. In that case, the protrusions are able to circumferentially flex when a force is radial outwardly applied on the protrusions.

Figure 3:
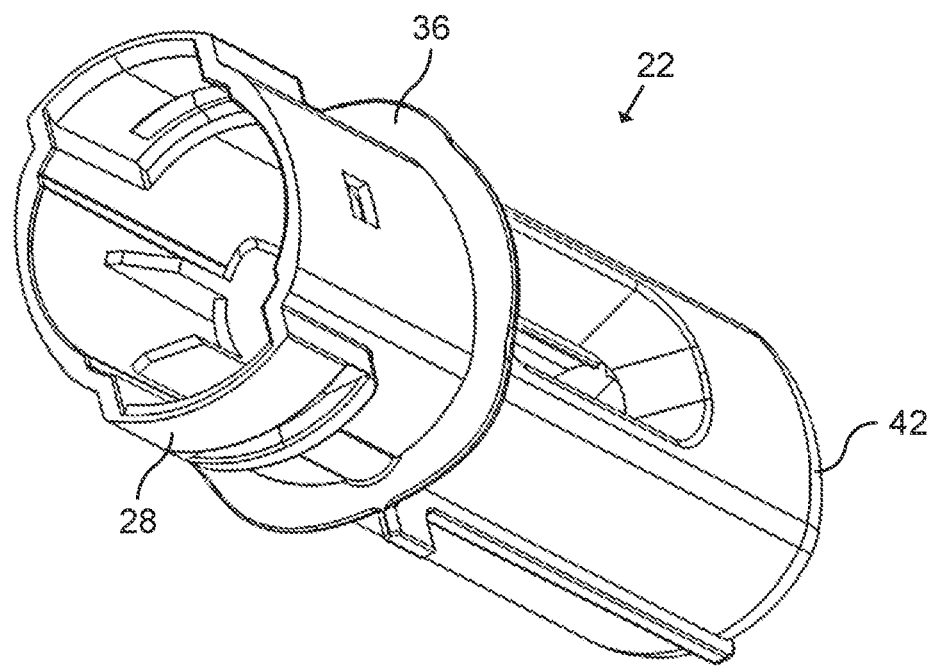
FIG. 3 schematically represents a perspective proximal view of a body of the cassette.
Figure 4:
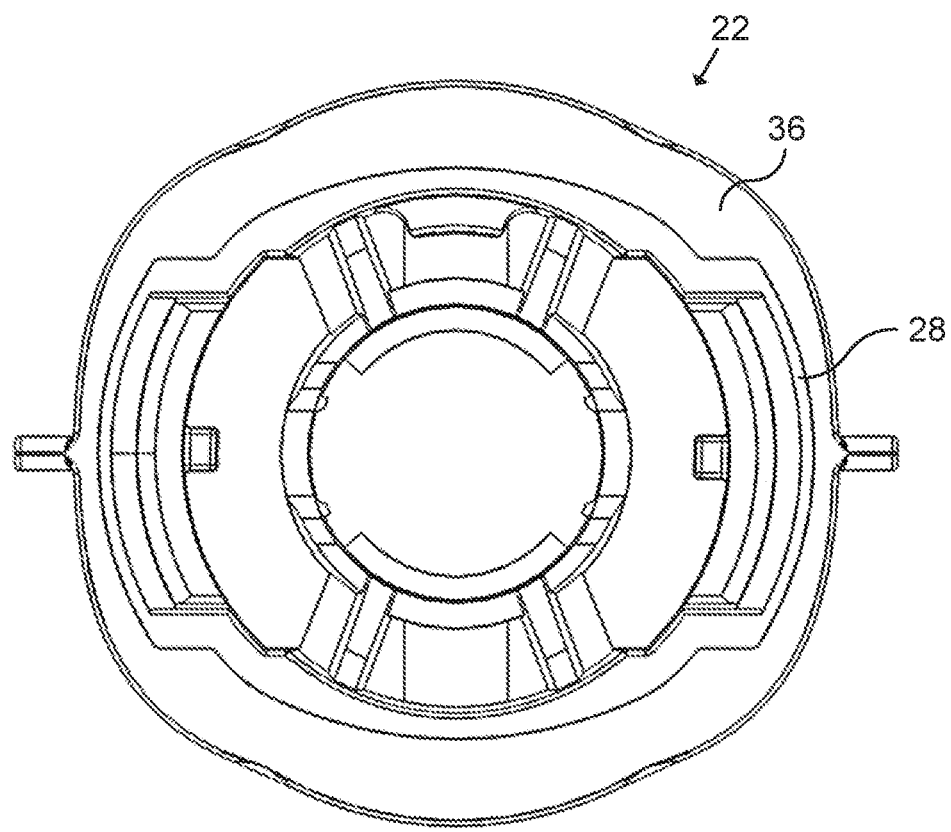
FIG. 4 schematically represents a proximal view of the body.

FIG. 3 schematically represents a perspective proximal view of the body 22, and FIG. 4 schematically represents a proximal view of the body 22. The body 22 of this example is made of plastic. The body 22 may be injection molded in one single piece.

Figure 6:
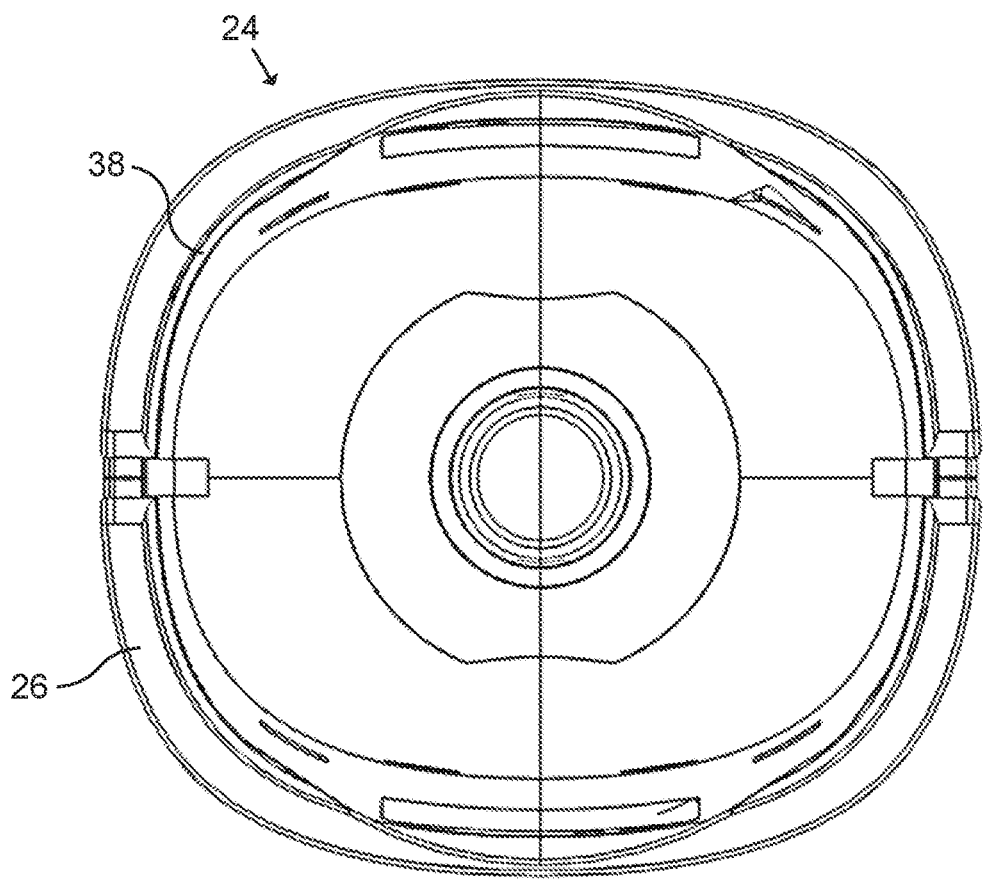
FIG. 6 schematically represents a proximal view of the cap.

FIG. 5 schematically represents a perspective proximal view of the cap 24, and FIG. 6 schematically represents a proximal view of the cap 24. The cap 24 of this example is made of plastic. The cap 24 may be injection molded in one single piece.

Figure 7:
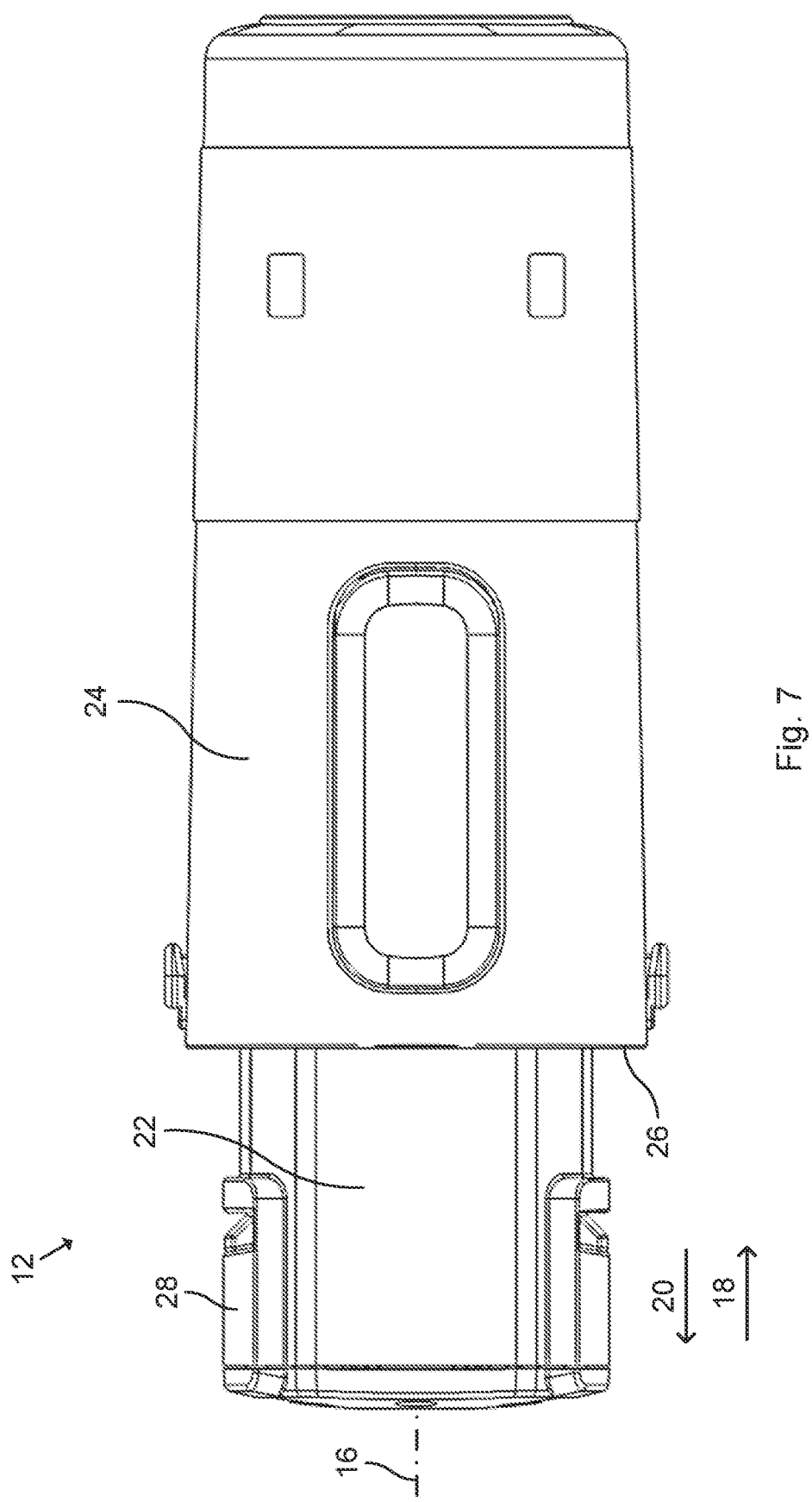
FIG. 7 schematically represents a side view of the cassette.
Figure 8:
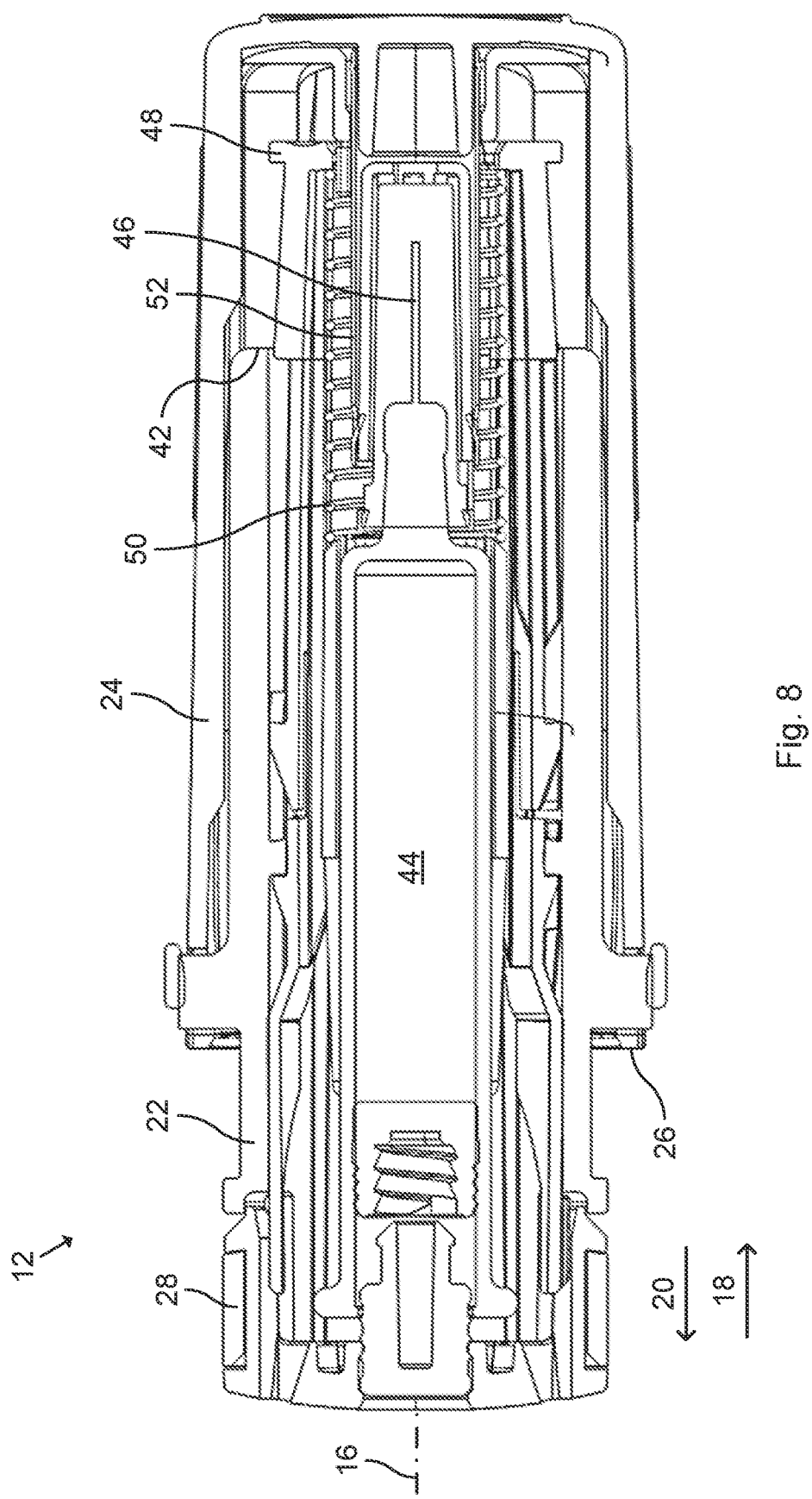
FIG. 8 schematically represents a cross-sectional side view of the cassette.
Figure 9:
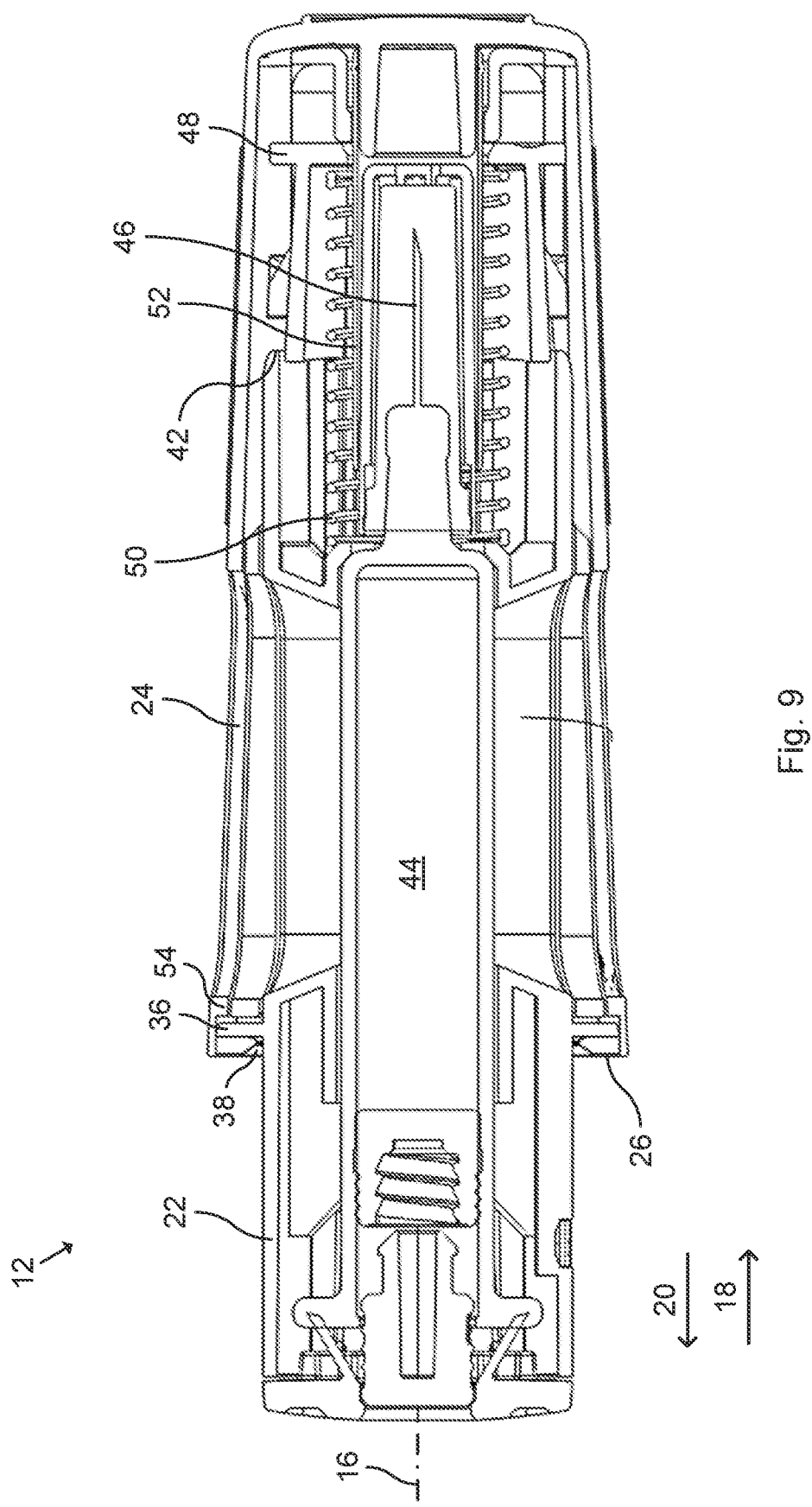
FIG. 9 schematically represents a further cross-sectional side view of the cassette.

FIG. 7 schematically represents a side view of the cassette 12, FIG. 8 schematically represents a cross-sectional side view of the cassette 12, and FIG. 9 schematically represents a further cross-sectional side view of the cassette 12. As shown in FIGS. 8 and 9, the cap 24 encloses a proximal end 42 of the body 22. Moreover, the cap 24 of this example covers a major portion of the body 22, approximately 65% of a length of the body 22 along the longitudinal axis 16.

With collective reference to FIGS. 8 and 9, the cassette 12 further holds a medicament container 44 containing a medicament. The medicament container 44 may be detachably detached to the cassette 12. Alternatively, the medicament container 44 may be permanently attached in the cassette 12. In any case, the medicament container 44 is accommodated in the body 22.

The cassette 12 of this example further comprises a needle 46. The needle 46 is one example of a medicament delivery member according to the present disclosure. The needle 46 is concentric with the longitudinal axis 16.

The cassette 12 of this example further comprises a cover 48. The cover 48 covers the needle 46. The cap 24 encloses the cover 48.

The cassette 12 of this example further comprises a spring 50. The spring 50 forces the cover 48 in the proximal direction 18.

The cassette 12 of this example further comprises a shield 52. The shield 52 covers the needle 46 and provides a sterile barrier. The shield 52 of this example comprises a flexible needle shield and a rigid needle shield outside the flexible needle shield.

As shown in FIG. 9, the cap 24 further comprises a stopper 54. The stopper 54 is here exemplified as a radially inwardly (with respect to the longitudinal axis 16) protruding collar. When the connection 40 is connected, the flange 36 is provided between the cap protrusions 38 and the stopper 54. The stopper 54 thus prevents the cap 24 from moving relative to the body 22 in the distal direction 20.

Figure 10:
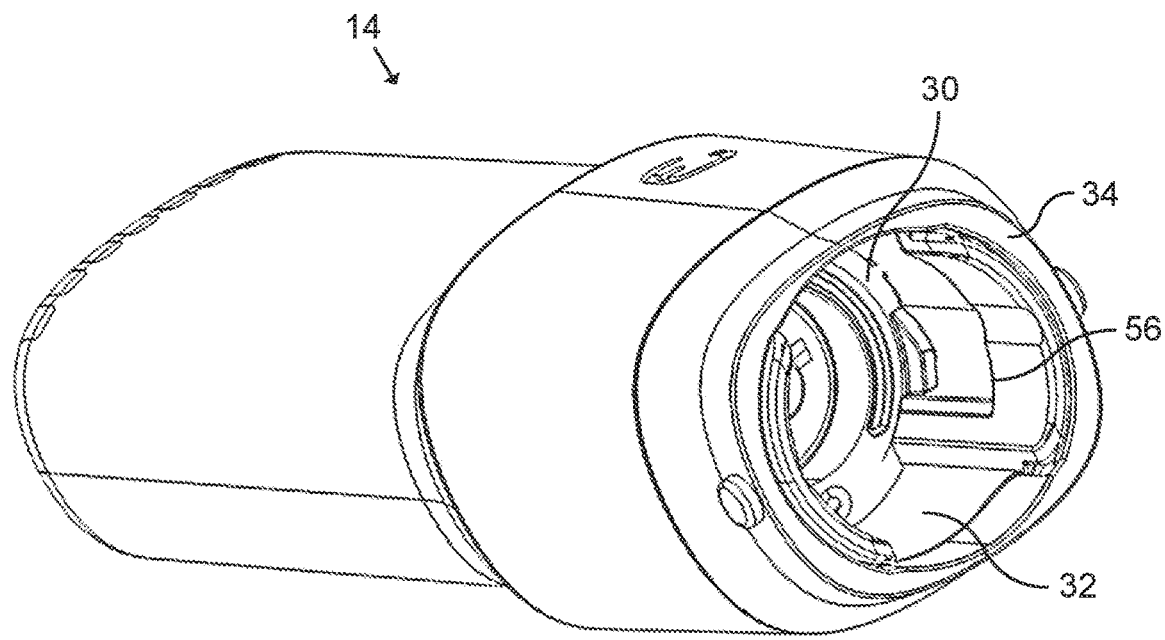
FIG. 10 schematically represents a perspective distal view of the base unit.
Figure 11:
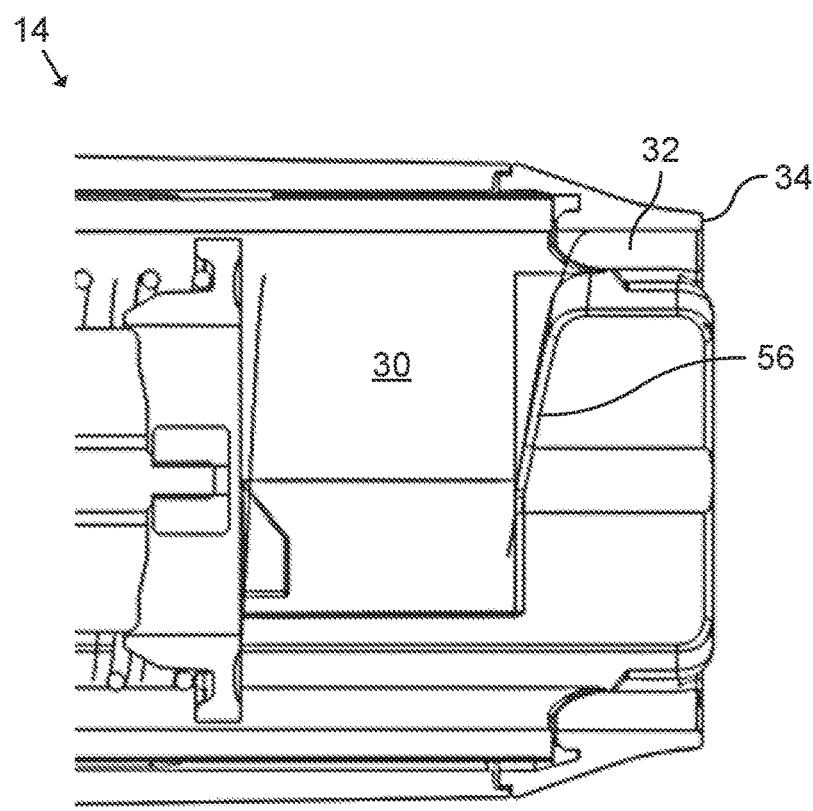
FIG. 11 schematically represents a partial cross-sectional side view of the base unit.

FIG. 10 schematically represents a perspective distal view of the base unit 14, and FIG. 11 schematically represents a partial cross-sectional side view of the base unit 14. With collective reference to FIGS. 10 and 11, the base unit 14 of this example comprises two cam profiles 56 (only one is visible in FIGS. 10 and 11). The cam profiles 56 are provided in a proximal region of the base unit 14. The cam profiles 56 are oppositely arranged, with respect to the longitudinal axis 16, in the opening 30 of the base unit 14. Each cam profile 56 is one example of a base engageable structure according to the present disclosure. Each cam profile 56 extends helically with respect to the longitudinal axis 16. In this example, each cam profile 56 has an angular extension around the longitudinal axis 16 of approximately 90°.

When the cassette 12 is inserted into the base unit 14 in the distal direction 20, the cam followers 28 travel in a respective slot 32 of the base unit 14. When the cassette 12 is then rotated about the longitudinal axis 16 relatively to the base unit 14 in order to attach the cassette 12 to the base unit 14, the cam followers 28 engage a respective cam profile 56 and therefore formed an interface in between. Due to the interface between the cam followers 28 and the cam profiles 56, this rotation of the cassette 12 about the longitudinal axis 16 relative to the base unit 14 causes a distal force to be generated on the body 22. The distal force acts on the body 22 in the distal direction 20.

Moreover, when the cassette 12 has been inserted into the base unit 14, the distal surface 26 of the cassette 12 mates with the proximal surface 34 of the base unit 14. When the cassette 12 inserted into the base unit 14 and rotated while the cam followers 28 engage the respective cam profiles 56, the distal force will act on the body 22 to force the body 22 in the distal direction 20. However, due to the engagement between the distal surface 26 and the proximal surface 34, the cap 24 is prevented from moving in the distal direction 20. The distal force acting on the body 22 therefore acts relative to the cap 24 and causes the body 22 to move in the distal direction 20 relative to the cap 24 such that the flange 36 snaps through the cap protrusions 38 and therefore provide the radially outward force that is applied on the protrusions 38, such radially outward force causes the protrusions 38 flex radially outward. The connection 40 is thereby disconnected. The connection 40 is thus arranged to be disconnected by means of a distal force acting in the distal direction 20 on the body 22 relative to the cap 24.

The body 22 and the cap 24 are rotationally locked such that relative rotation therebetween about the longitudinal axis 16 is prevented. The cam followers 28, the cam profiles 56, the connection 40, the distal surface 26 and the proximal surface 34 form one example of a cap unlock mechanism that is configured to transmit a rotation of the cassette 12 about the longitudinal axis 16 to a movement of the body 22 relative to the cap 24 in the distal direction 20.

Figure 12:
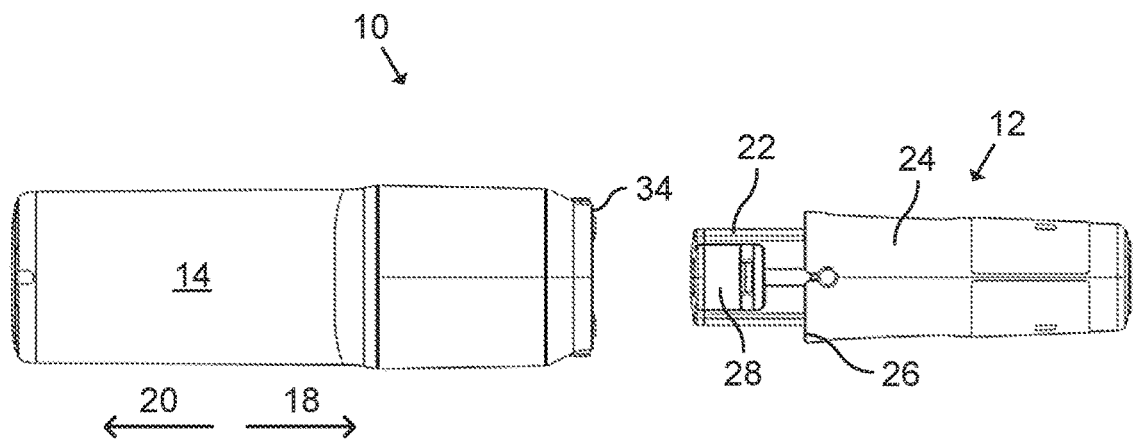
FIG. 12 schematically represents a side view of the medicament delivery device prior to attachment of the cassette to the base unit.

FIG. 12 schematically represents a side view of the medicament delivery device 10 prior to attachment of the cassette 12 to the base unit 14. In the state of the medicament delivery device 10 according to FIG. 12, the cap 24 cannot easily be removed from the cassette 12 since the cap 24 is locked to the body 22 by means of the connection 40.

Figure 13:
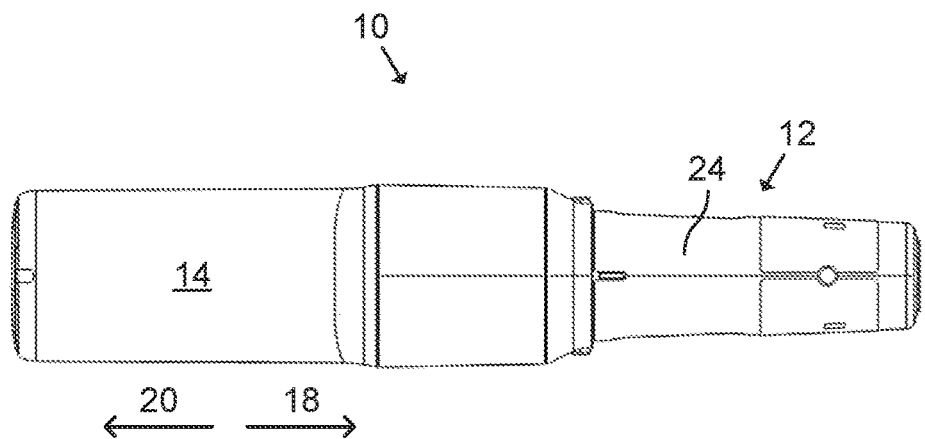
FIG. 13 schematically represents a side view of the medicament delivery device after insertion of the cassette into the base unit.

FIG. 13 schematically represents a side view of the medicament delivery device 10 after insertion of the cassette 12 into the base unit 14. During insertion, the cam followers 28 travel in a respective slot 32 in the base unit 14. The cassette 12 is inserted into the base unit 14 until the distal surface 26 of the cap 24 is brought into contact with the proximal surface 34 of the base unit 14. Also in the state of the medicament delivery device 10 according to FIG. 13, the cap 24 cannot easily be removed from the cassette 12.

Figure 14:
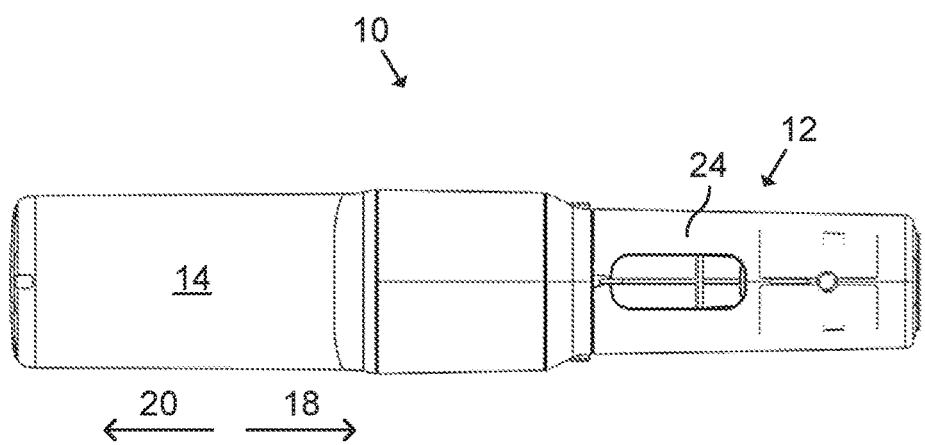
FIG. 14 schematically represents a side view of the medicament delivery device after rotation of the cassette relative to the base unit.

FIG. 14 schematically represents a side view of the medicament delivery device 10 after rotation of the cassette 12 about the longitudinal axis 16 relative to the base unit 14. In FIG. 14, the cassette 12 is attached to the base unit 14. As the cassette 12 is rotated relative to the base unit 14, the connection 40 is disconnected and the cap 24 is unlocked from the body 22. In this example, the cassette 12 has been rotated 90° in the clockwise direction as seen in the distal direction 20.

When the cassette 12 is rotated, each cam follower 28 engages and follows an associated cam profile 56. The interaction between the cam follower 28 and the cam profile 56 causes a distal force acting in the distal direction 20 to be generated that acts on the body 22. Since the cap 24 is prevented from moving in the distal direction 20 due to the contact between the distal surface 26 and the proximal surface 34, the distal force acting on the body 22 acts relative to the cap 24. The distal surface 26 thereby acts as a counterstay.

The distal force acting on the body 22 relative to the cap 24 due to the rotation of the cassette 12 causes the flange 36 to snap through the cap protrusion 38. The connection 40 is thereby released. Further rotation of the cassette 12 causes further movement of the body 22 in the distal direction 20 until the flange 36 is brought into contact with the proximal surface 34. When the flange 36 contacts the proximal surface 34, the cassette 12 cannot be rotated further and the body 22 cannot be moved further in the distal direction 20. The cassette 12 is thereby attached to the base unit 14. By means of the rotation of the cassette 12, two functions are performed: the connection 40 is disconnected and the cassette 12 is attached to the base unit 14. The distal force for releasing the connection 40 is thus generated by a mounting sequence of the cassette 12 to the base unit 14. In this way, premature removal of the cap 24 can be prevented. That is, the medicament delivery device 10 prevents removal of the cap 24 prior to attachment of the cassette 12 to the base unit 14.

Figure 15:
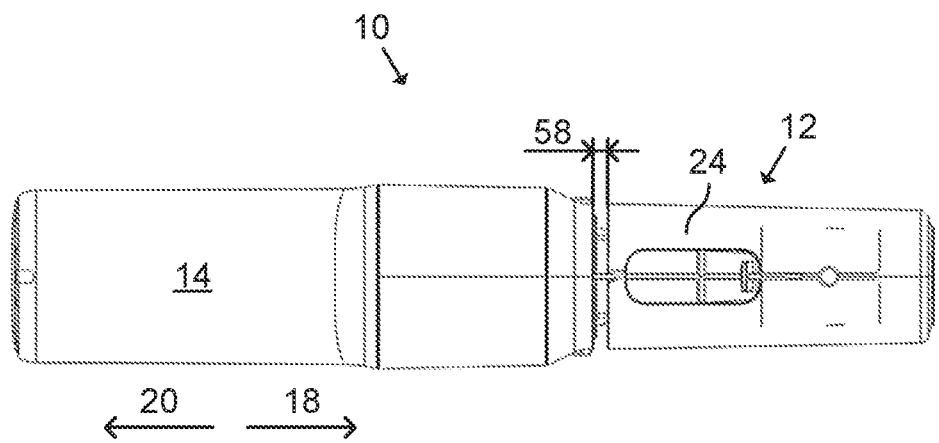
FIG. 15 schematically represents a side view of the medicament delivery device after proximal movement of the cap relative to the base unit and relative to the body.

FIG. 15 schematically represents a side view of the medicament delivery device 10 after proximal movement of the cap 24 relative to the base unit 14 and relative to the body 22. This proximal movement is possible since the connection 40 between the cap 24 and the body 22 is disconnected. After disconnection of the connection 40, the cap 24 can move slightly along the longitudinal axis 16. This allows a gap 58 to appear between the cap 24 and the base unit 14. The gap 58 may for example be 1 mm to 10 mm. The appearance of this gap 58 indicates to the user that the cap 24 is free to be removed. The cap 24 can now be entirely removed by pulling the cap 24 in the proximal direction 18.

Figure 16:
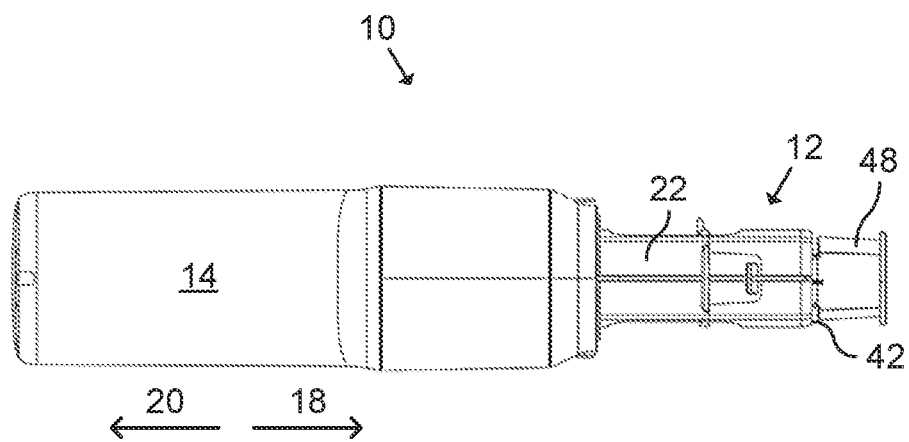
FIG. 16 schematically represents a side view of the medicament delivery device after removal of the cap.

FIG. 16 schematically represents a side view of the medicament delivery device 10 after removal of the cap 24. The cover 48 is now exposed. The removal of the cap 24 also causes the shield 52 to be removed as described below.

The cassette 12 is thus inserted into the base unit 14 by movement in the distal direction 20 and the cap 24 is removed from the cassette 12 by movement in the proximal direction 18, opposite to the distal direction 20. The risk that the user is injured by the needle 46 is therefore reduced. As mentioned above, this risk may be present for medicament delivery devices where the cap can be removed prior to insertion of the cassette into the base unit.

By pressing the cover 48 against a dose delivery site, the cover 48 moves in the distal direction 20 relative to the medicament delivery device 10 against the compression force of the spring 50. At the same time, the needle 46 pierces into the dose delivery site. The distal movement of the cover 48 activates the medicament delivery in manners known per se. For example, the distal movement of the cover 48 may activate a drive mechanism that rotationally drives a rotator in the cassette 12 to release a spring force that drives medicament expulsion through the needle 46 and into the dose delivery site.

After injection, the cap 24 can be put over the body 22 by the user to be used as a tool to detach the cassette 12 from the base unit 14. If the cap 24 is refitted onto the cassette 12, the cap 24 also adds an additional layer of safety in regards of needle stick injuries after use.

Figure 17:
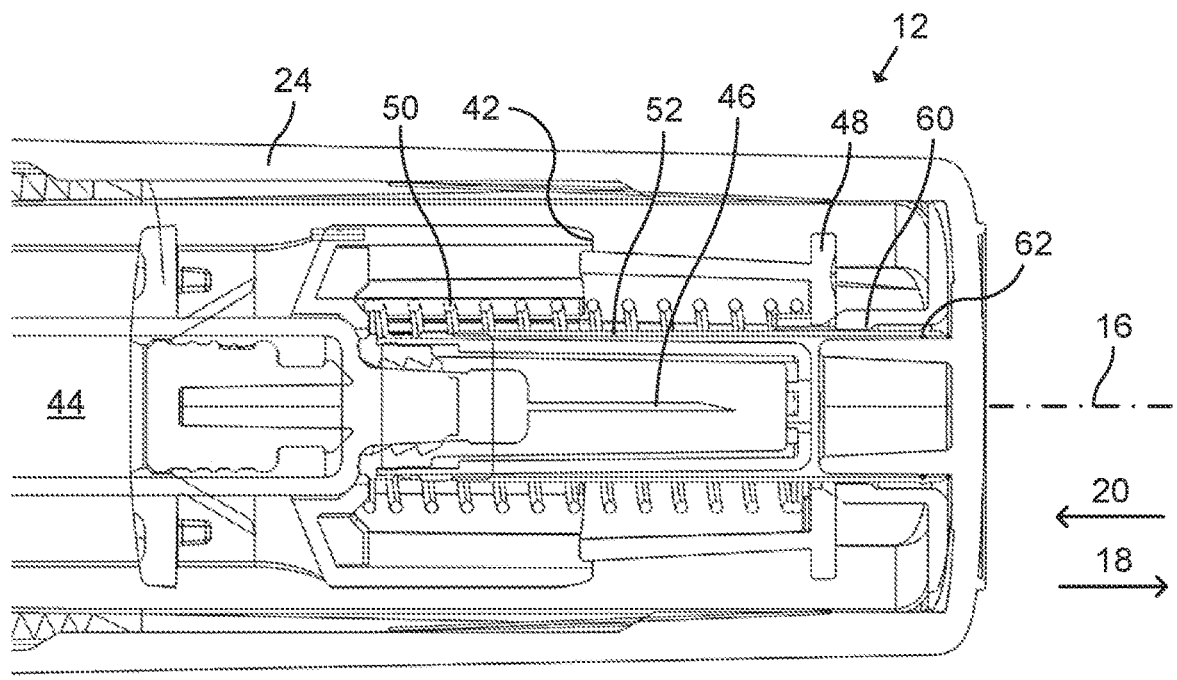
FIG. 17 schematically represents a partial cross-sectional side view of the cassette according to FIG. 14.

FIG. 17 schematically represents a partial cross-sectional side view of the cassette 12 in the state according to FIG. 14. As shown in FIG. 17, the cap 24 comprises a cap engaging structure 60 and the shield 52 comprises a shield engageable structure 62. The cap engaging structure 60 of this example is a radially inwardly (with respect to the longitudinal axis 16) protruding collar. The shield engageable structure 62 of this example is a radially outwardly (with respect to the longitudinal axis 16) protruding collar. As shown in FIG. 17, the cap engaging structure 60 is distanced from the shield engageable structure 62 in the distal direction 20. When the connection 40 is disconnected, the cap 24 is free to move in the proximal direction 18 until the cap engaging structure 60 contacts the shield engageable structure 62.

Figure 18:
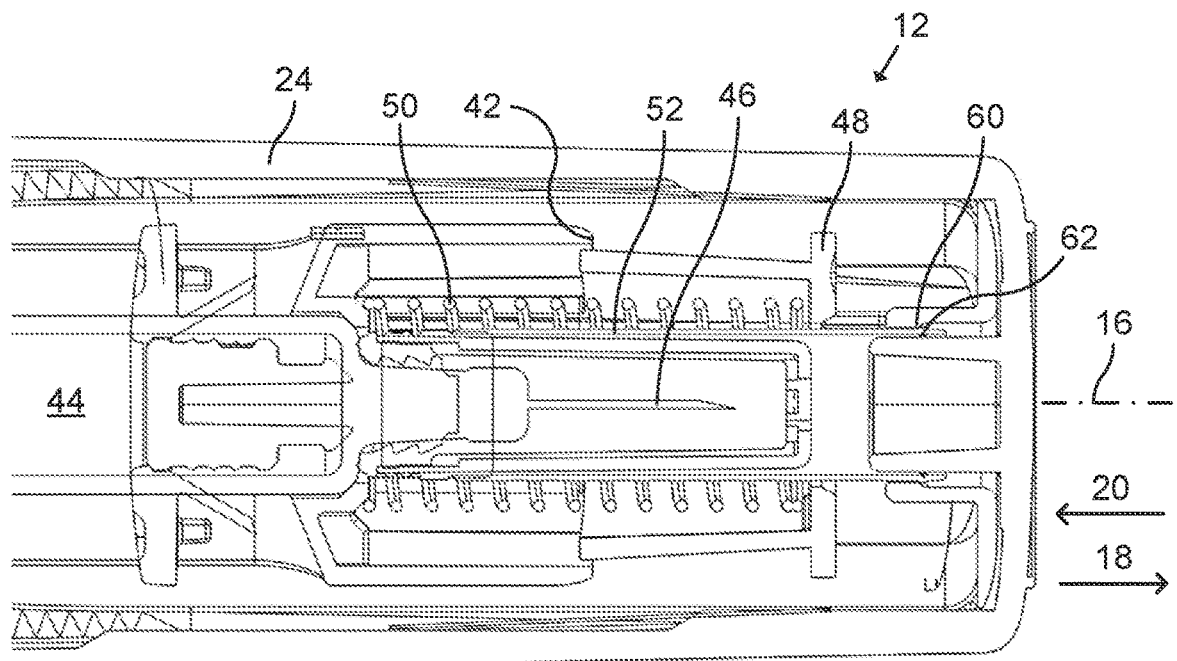
FIG. 18 schematically represents a partial cross-sectional side view of the cassette according to FIG. 15.

FIG. 18 schematically represents a partial cross-sectional side view of the cassette 12 in the state according to FIG. 15. In FIG. 18, the cap engaging structure 60 contacts the shield engageable structure 62. If the user were to disconnect cassette 12 from the base unit 14 from the state in FIG. 18, the sterile barrier in the shield 52 would be intact.

In this example, only the engagement between the cap engaging structure 60 and the shield engageable structure 62 prevents the cap 24 from being removed from the cassette 12. The shield 52 is prevented from moving in the proximal direction 18 by the frictional force between the shield 52 and the needle 46. In this example, no additional force that prevents movement of the cap 24 in the proximal direction 18 is present.

The cassette 12 may further comprise a spring (not shown) arranged to force the cap 24 in the proximal direction 18. In this way, the gap 58 will automatically appear when the connection 40 is disconnected.

Further movement of the cap 24 in the proximal direction 18 causes the cap 24 and the shield 52 to be removed from the cassette 12. In more detail, the further movement of the cap 24 in the proximal direction 18 causes the cap engaging structure 60 to push on the shield engageable structure 62 and thereby the shield 52 to be forced in the proximal direction 18. The shield 52 is thereby also removed when the cap 24 is removed from the cassette 12.

While the present disclosure has been described with reference to exemplary embodiments, it will be appreciated that the present disclosure is not limited to what has been described above. For example, it will be appreciated that the dimensions of the parts may be varied as needed. Accordingly, it is intended that the present disclosure may be limited only by the scope of the claims appended hereto.

The invention claimed is:

1. A cassette for a medicament delivery device having a base unit, the cassette comprising:
 a longitudinal axis defining a proximal direction and a distal direction;
 a body for accommodating a medicament container;
 a medicament delivery member; and
 a cap connected to the body by means of a connection, the cap enclosing a proximal end of the body;
 wherein the connection is arranged to be disconnected by means of a distal force acting in the distal direction on the body relative to the cap when the cassette is attached to the base unit.

2. The cassette according to claim 1, wherein the connection comprises a snap-fit.

3. The cassette according to claim 1, wherein the connection comprises a cap protrusion arranged on the cap.

4. The cassette according to claim 3, wherein the cap protrusion is radially flexible.

5. The cassette according to claim 3, wherein the cap protrusion extends laterally inwards with respect to the longitudinal axis.

6. The cassette according to claim 1, wherein the connection comprises a body connection protrusion arranged on the body.

7. The cassette according to claim 6, wherein the body connection protrusion extends laterally outwards with respect to the longitudinal axis.

8. The cassette according to claim 6, wherein the body connection protrusion is a flange.

9. The cassette according claim 6, wherein the body connection protrusion is flexible.

10. The cassette according to claim 1, further comprising a cover covering the medicament delivery member, wherein the cap encloses the cover.

11. A medicament delivery device comprising a cassette according to claim 1, wherein the medicament delivery device further comprises a base unit arranged to drive expulsion of medicament from a medicament container in the cassette when the cassette is attached to the base unit.

12. The medicament delivery device according to claim 11, wherein the body comprises a body engaging structure, wherein the base unit comprises a base engageable structure, and wherein an interface is formed between the body engaging structure and the base engageable structure; such that the distal force is generated by rotation of the body about the longitudinal axis relative to the base unit when the body engaging structure engages the base engageable structure.

13. The medicament delivery device according to claim 12, wherein the interface can be a cam interface, a screw thread interface or a bayonet interface.

14. The medicament delivery device according to claim 13, wherein the interface is a cam interface; and wherein the base engageable structure and the body engaging structure comprise a cam profile and a cam follower arranged to follow the cam profile.

15. The medicament delivery device according to claim 11, wherein the base unit comprises a proximal surface, and wherein the cap comprises a distal surface arranged to mate with the proximal surface when the cassette is inserted into the base unit.

16. A medicament delivery device comprising:
a reusable a base unit; and
a cassette comprising:
a longitudinal axis defining a proximal direction and a distal direction;
a body configured to hold a pre-filled medicament container;
a medicament delivery member in fluid communication with a proximal end of the medicament container; and
a cap removably connected to the body through a snap fit connector such that the cap encloses a proximal end of the body,
wherein when a distally directed force is applied to the body during attachment of the cassette to the base unit, the snap fit connector will release the cap from the body in the proximal direction.

17. The medicament delivery device of claim 16, wherein the snap fit connector comprises:

a cap protrusion arranged on the cap and is radially flexible; and a body connection protrusion arranged on the body.

18. The medicament delivery device of claim 17, wherein when the cap is attached to the body, the cap protrusion that extends laterally inwards with respect to the longitudinal axis will engage the body connection protrusion that extends laterally outwards with respect to the longitudinal axis.

19. The medicament delivery device according to claim 16, wherein the body comprises a body engaging structure configured to mate with a base engageable structure on a proximal end of the base unit, and wherein an interface is formed between the body engaging structure and the base engageable structure such that a distal force is exerted on the body relative to the cap and is generated by rotation of the body about the longitudinal axis relative to the base unit when the body engaging structure engages the base engageable structure.

20. The medicament delivery device according to claim 19, wherein the interface defines a cam interface, a screw thread interface or a bayonet interface.

\* \* \* \* \*